US012145856B2

United States Patent
Chester et al.

(10) Patent No.: US 12,145,856 B2
(45) Date of Patent: Nov. 19, 2024

(54) PURIFICATION OF ORES USING BORONIC ACID-FUNCTIONAL COMPOUNDS

(71) Applicant: Ecolab USA Inc., St. Paul, MN (US)

(72) Inventors: Ryan Travis Chester, Connolly (AU); John D. Kildea, Baldivis (AU)

(73) Assignee: Ecolab USA Inc., St. Paul, MN (US)

(*) Notice: Subject to any disclaimer, the term of this patent is extended or adjusted under 35 U.S.C. 154(b) by 255 days.

(21) Appl. No.: 17/669,568

(22) Filed: Feb. 11, 2022

(65) Prior Publication Data
US 2022/0259061 A1 Aug. 18, 2022

Related U.S. Application Data

(60) Provisional application No. 63/148,649, filed on Feb. 12, 2021.

(51) Int. Cl.
*C01F 7/06* (2022.01)
(52) U.S. Cl.
CPC ...................... *C01F 7/06* (2013.01)
(58) Field of Classification Search
CPC ......................................................... C01F 7/06
See application file for complete search history.

(56) References Cited

U.S. PATENT DOCUMENTS

| | | |
|---|---|---|
| 2,181,695 A | 11/1939 | Given |
| 2,184,703 A | 12/1939 | Spangenberg |
| 2,257,347 A | 9/1941 | Raymer |
| 2,935,377 A | 5/1960 | Jones |
| 3,085,853 A | 4/1963 | Lesinski et al. |
| 3,390,959 A | 7/1968 | Sibert |
| 3,397,953 A | 8/1968 | Galvin et al. |
| 3,445,187 A | 5/1969 | Sibert |
| 3,541,009 A | 11/1970 | Arendt et al. |
| 3,575,868 A | 4/1971 | Galvin et al. |
| 3,642,437 A | 2/1972 | Angstadt et al. |
| 3,681,012 A | 8/1972 | Sibert |
| 3,728,432 A | 4/1973 | Petitjean et al. |
| 3,770,808 A | 11/1973 | Marquis et al. |
| 4,001,210 A | 1/1977 | Engelskirchen et al. |
| 4,013,821 A | 3/1977 | Engelskirchen et al. |
| 4,096,326 A | 6/1978 | Reid |
| 4,159,255 A | 6/1979 | Gainer et al. |
| 4,215,094 A | 7/1980 | Inao et al. |
| 4,256,709 A | 3/1981 | Sizyakov et al. |
| 4,267,064 A | 5/1981 | Sasaki et al. |
| 4,339,331 A | 7/1982 | Lim et al. |
| 4,478,795 A | 10/1984 | Hereda et al. |
| 4,512,959 A | 4/1985 | Pohland et al. |
| 4,523,010 A | 6/1985 | Lukach et al. |
| 4,576,942 A | 3/1986 | Youssefyeh |
| 4,597,952 A | 7/1986 | Fabre et al. |
| 4,608,237 A | 8/1986 | Roe et al. |
| 4,663,133 A | 5/1987 | Malito et al. |
| 4,668,486 A | 5/1987 | Brown et al. |
| 4,737,352 A | 4/1988 | Owen et al. |
| 4,767,540 A | 8/1988 | Spitzer et al. |
| 4,789,485 A | 12/1988 | Field et al. |
| 4,836,990 A | 6/1989 | Swinkels et al. |
| 5,008,089 A | 4/1991 | Moody et al. |
| 5,021,179 A | 6/1991 | Zehler et al. |
| 5,030,340 A | 7/1991 | Panzer et al. |
| 5,041,269 A | 8/1991 | Moody et al. |
| 5,049,612 A | 9/1991 | Bulatovic et al. |
| 5,091,159 A | 2/1992 | Connelly et al. |
| 5,093,092 A | 3/1992 | Misra et al. |
| 5,106,599 A | 4/1992 | Roe |
| 5,217,620 A | 6/1993 | Mahoney et al. |
| 5,275,628 A | 1/1994 | Dimas et al. |
| 5,286,391 A | 2/1994 | Malito et al. |
| 5,290,465 A | 3/1994 | Sabahi |

(Continued)

FOREIGN PATENT DOCUMENTS

| | | |
|---|---|---|
| AU | 737191 B2 | 8/2001 |
| CA | 825234 A | 10/1969 |

(Continued)

OTHER PUBLICATIONS

Alton T. Tabereaux, Ray D. Peterson. Chapter 2.5—Aluminum Production. In: Treatise on Process Metallurgy. Elsevier, 2014, pp. 839-917, ISBN 9780080969886, https://doi.org/10.1016/B978-0-08-096988-6.00023-7. (Year: 2014).*

Zhao, S., et al. Influence of additives on physico-chemical properties of sodium aluminate solution using seed precipitation in the Bayer process. The European Journal of Mineral Processing and Environmental Protection, vol. 5, No. 2, 1303-0868, 2005, pp. 197-201. (Year: 2005).*

International Search Report mailed on Jun. 2, 2022 in International Application No. PCT/US2022/016054, 5 pages.

Written Opinion mailed on Jun. 2, 2022 in International Application No. PCT/US2022/016054, 8 pages.

Hind et al., The surface chemistry of Bayer process solids: a review, Colloids and Surfaces A: Physicochemical and Engineering Aspects, vol. 146, pp. 359-374 (1999).

(Continued)

*Primary Examiner* — Anthony J Zimmer
*Assistant Examiner* — Eric Scott Sherman
(74) *Attorney, Agent, or Firm* — Kagan Binder, PLLC

(57) ABSTRACT

Described herein is a method of adding one or more boronic acid functional compounds to a mineral ore to result in a treated mineral ore. Where the mineral ore is a bauxite ore, and the ore is subsequently processed according to the Bayer process to obtain alumina, adding a boronic acid functional compound to the bauxite ore or a Bayer product followed by processing the treated bauxite ore or treated Bayer product using one or more processes associated with the Bayer process results in an increased yield of alumina product, increased alumina content (purity) in the alumina product obtained, or both when compared to the same bauxite ore or Bayer product subjected to the same process(es) but in the absence of a boronic acid functional compound.

9 Claims, No Drawings

(56) References Cited

U.S. PATENT DOCUMENTS

| | | | |
|---|---|---|---|
| 5,346,628 A | 9/1994 | Sommese et al. | |
| 5,387,405 A | 2/1995 | Connelly et al. | |
| 5,415,782 A | 5/1995 | Dimas | |
| 5,463,037 A | 10/1995 | Kiyose et al. | |
| 5,478,477 A | 12/1995 | Ramesh et al. | |
| 5,516,435 A | 5/1996 | Lewellyn | |
| 5,534,235 A | 7/1996 | Reed et al. | |
| 5,601,726 A | 2/1997 | Cole | |
| 5,711,923 A | 1/1998 | Harris et al. | |
| 5,716,530 A | 2/1998 | Strominger et al. | |
| 5,728,180 A | 3/1998 | Williams et al. | |
| 5,837,215 A | 11/1998 | Tippett et al. | |
| 5,853,677 A | 12/1998 | Avotins et al. | |
| 5,951,955 A | 9/1999 | Flieg et al. | |
| 6,033,579 A | 3/2000 | Riemer et al. | |
| 6,048,463 A | 4/2000 | Selvarajan et al. | |
| 6,168,767 B1 | 1/2001 | Welton et al. | |
| 6,210,585 B1 | 4/2001 | Tippett et al. | |
| 6,365,116 B1 | 4/2002 | Barham et al. | |
| 6,555,077 B1 | 4/2003 | Rosenberg et al. | |
| 6,599,489 B2 | 7/2003 | Mahoney et al. | |
| 6,605,674 B1 | 8/2003 | Whipple et al. | |
| 6,652,902 B2 | 11/2003 | Hubbell et al. | |
| 6,669,852 B2 | 12/2003 | Ishikawa et al. | |
| 6,726,845 B1 | 4/2004 | Barham et al. | |
| 6,740,249 B1 | 5/2004 | Barham | |
| 6,814,873 B2 | 11/2004 | Spitzer et al. | |
| 6,821,440 B2 | 11/2004 | Gallagher et al. | |
| 7,264,729 B2 | 9/2007 | Yawn | |
| 7,666,373 B2 | 2/2010 | Rosenberg | |
| 7,704,471 B2 | 4/2010 | Tizon et al. | |
| 7,771,681 B2 | 8/2010 | Kouznetsov et al. | |
| 7,875,188 B2 | 1/2011 | Dymond et al. | |
| 7,901,583 B2 | 3/2011 | Mccoll et al. | |
| 7,943,713 B2 | 5/2011 | Pelton et al. | |
| 7,976,820 B2 | 7/2011 | Liu et al. | |
| 7,976,821 B2 | 7/2011 | Liu et al. | |
| 8,216,534 B2 | 7/2012 | Ballentine et al. | |
| 8,252,266 B2 | 8/2012 | Chester et al. | |
| 8,298,508 B2 | 10/2012 | Wang et al. | |
| 8,708,045 B2 | 4/2014 | Ogle et al. | |
| 8,778,140 B2 | 7/2014 | Cheng et al. | |
| 8,926,939 B2 | 1/2015 | Kouznetsov et al. | |
| 8,971,913 B2 | 3/2015 | Moeglein et al. | |
| 9,034,145 B2 | 5/2015 | Castro et al. | |
| 9,102,995 B2 | 8/2015 | Bode et al. | |
| 9,174,852 B2 | 11/2015 | Chester et al. | |
| 9,187,337 B2 | 11/2015 | Hanna et al. | |
| 9,199,855 B2 | 12/2015 | Urbani et al. | |
| 9,284,625 B2 | 3/2016 | Wang et al. | |
| 10,427,950 B2 | 10/2019 | Wang et al. | |
| 11,208,332 B2 | 12/2021 | Wang et al. | |
| 2006/0191853 A1 | 8/2006 | Ballentine et al. | |
| 2006/0272816 A1 | 12/2006 | Willberg et al. | |
| 2008/0107578 A1 | 5/2008 | Wang et al. | |
| 2008/0257827 A1 | 10/2008 | Dai et al. | |
| 2009/0197781 A1 | 8/2009 | Sunkara | |
| 2010/0029929 A1 | 2/2010 | Luczak et al. | |
| 2010/0170856 A1 | 7/2010 | Branning | |
| 2010/0224576 A1 | 9/2010 | Iannicelli | |
| 2012/0004148 A1 | 1/2012 | Ogle et al. | |
| 2012/0034142 A1 | 2/2012 | Wang et al. | |
| 2012/0067830 A1 | 3/2012 | Alarco et al. | |
| 2013/0012627 A1 | 1/2013 | Funston, Sr. | |
| 2013/0112627 A1 | 5/2013 | Urbani et al. | |
| 2014/0221256 A1 | 8/2014 | Holtsclaw et al. | |
| 2015/0344817 A1* | 12/2015 | Barnabas | C11D 3/166 162/76 |
| 2017/0158522 A1* | 6/2017 | Wang | C01F 7/0653 |

FOREIGN PATENT DOCUMENTS

| | | |
|---|---|---|
| CA | 1137760 A | 12/1982 |
| CA | 2014262 A1 | 4/1990 |
| CN | 104768627 A | 7/2015 |
| DE | 2415872 C2 | 10/1982 |
| EP | 0092028 A2 | 10/1983 |
| EP | 0465055 B1 | 4/1997 |
| ES | 2006995 A6 | 5/1989 |
| GB | 1154993 A | 6/1969 |
| JP | H05155734 A | 6/1993 |
| JP | H06206752 A | 7/1994 |
| JP | 2015123417 A | 7/2015 |
| RU | 2309123 C2 | 10/2007 |
| SU | 1562589 A1 | 5/1990 |
| WO | 90/09349 A1 | 8/1990 |
| WO | 97/29047 A1 | 8/1997 |
| WO | 97/38018 A1 | 10/1997 |
| WO | 1999029626 A1 | 6/1999 |
| WO | 2006108899 A1 | 10/2006 |
| WO | 2009085514 A2 | 7/2009 |
| WO | 2014105484 A1 | 7/2014 |
| WO | 2014158381 A1 | 10/2014 |
| WO | 2015047261 A1 | 4/2015 |
| WO | 2017096151 A1 | 6/2017 |

OTHER PUBLICATIONS

Kim et al., "Swelling Properties of Hydrogels Containing Phenylboronic Acids," Chemosensors 2014, 2, pp. 1-12; doi: 10.3990/chemosensors2010001.

Nishiyabu et al., "Boronic acid building blocks: tools for sensing and separation," Chem Commun. 2011, 47, pp. 1106-1123, doi: 10.1039/c0cc02920c.

Mu-Shih Lin et al., Synthesis and characterizations of allyl cellulose and glycidyl cellulose, J. Polymer Science, Part A: Polymer Chemistry (1992), 30(11), pp. 2303-2312.

Yasuhiko Onishi et al., 1,2-propanediol-cellulose-acrylamide graft copolymers, J. Applied Polymer Science, vol. 92, pp. 3022-3029 (2004).

K.Y. Zhang et al., Synthesis and characterization of 2,3-dihydroxypropyl cellulose, J. Macromolecular Science, Chemistry (1988), A25(8), pp. 955-970.

Kapusniak, Janusz et al., "Starch Based Depressors for Selective Flotation of Metal Sulfide Ores," Starch, vol. 51, No. 11-12, 2000, pp. 416-421.

Patil, Sachin, "Crosslinking of Polysaccharides: Methods and Applications" 2008, vol. 6 Issue 2, Pertinent pp. 1, and 6-7.

Termes, S. C. et al., "Insoluble crossslinked starch xanthate as a selective flocculant for sulfide minerals," Transactions of the American Institute of Mining, Metallurgical, and Petroleum Engineers, Society of Mining Engineers of AIME, vol. 274, 1983, pp. 1971-1977.

Johannes Fink, "Enhanced Oil Recovery", Petroleum Engineer's Guide to Oil Field Chemicals and Fluids, Second Edition, Gulf Professional Publishing, 2015, Chapter 16, 16.7 Polymer Waterflooding, p. 504.

Sonthalia et al., Review on alumina trihydrate precipitation mechanisms and effect of Bayer impurities on hydrate particle growth rate, International Journal of Mineral Processing, vol. 125, 2013, pp. 137-148.

Power et al., Organic compounds in the processing of lateritic bauxites to alumina: Part 1: Origins and chemistry of organics in the Bayer process, Hydrometallurgy, vol. 105, 2010, pp. 1-29.

Power et al., Organic compounds in the processing of lateritic bauxites to alumina Part 2: Effects of organics in the Bayer process, Hydrometallurgy, vol. 127-128, 2012, pp. 125-149.

Brian A. Schumacher, Methods for the Determination of Total Organic Carbon (TOC) in Soils and Sediments, United States Environmental Protection Agency, NCEA-C-1282, Apr. 2002, 25 pages.

Soucy et al., Organic Control Technologies in Bayer Process, Light Metals, 2004, pp. 109-114.

Brooks et al., Structure-Reactivity Relationships in Boronic Acid-Diol Complexation, ACS Omega, 2018, vol. 3, pp. 17863-17870.

(56) References Cited

OTHER PUBLICATIONS

Roy et al., "Sugar-responsive block copolymers by direct RAFT polymerization of unprotected boronic acid monomers," ChemComm. 21(21): pp. 2477-2479, 2008.

* cited by examiner

PURIFICATION OF ORES USING BORONIC ACID-FUNCTIONAL COMPOUNDS

BACKGROUND

Production of minerals from ore is generally energy intensive and costly. Despite using methods often refined for well over a century, there are still many industry challenges to improve mineral production processes. In particular, use of increasingly lower grade ores of lower available product content and greater mineral complexity present an ongoing need for processes and materials to maximize product yield, conserve energy, and minimize operational costs. Attempts to meet these targets are increasingly faced with complicating factors in the use of low-grade ores. For example, higher levels of impurities capable of "poisoning" the process may become increasingly prevalent as lower grade ores are mined. Continuous mineral purification processes lead to recycling and possible concentration of high levels of impurities obtained from low grade ores, further reducing yield where one or more of the impurities cause poisoning.

Native impurities found in mineral ores often include organic (carbon-based) compounds. These organic compounds often include carboxyl and hydroxyl moieties, for example, and/or other moieties characterized by carbon-heteroatom bonds. Such moieties may interact with the components of and/or under the conditions of a mineral purification process. For example, an organic compound may degrade, react, or rearrange when subjected to contact with the chemicals and/or conditions employed in ore processing. In some cases, the organic compounds themselves or a degradation product, reaction product, or rearrangement product thereof cause poisoning of one or more steps in a conventional ore purification process. That is, the result of one or more organic compounds interacting with one or more components of and/or under conditions of the mineral purification process reduced the yield of mineral obtained.

On an industrial scale, bauxite ore is first processed and purified to obtain aluminum oxide (also known as "aluminum (III) oxide" and "alumina"), which is then converted to aluminum metal. The process of producing aluminum oxide from bauxite at the industrial scale is accomplished by the Bayer process.

It is understood by those of skill that organic compounds can interact with the components of and/or under the conditions of the conventional bauxite purification process. These organic contaminants inhibit aluminum hydroxide precipitation, reduce liquor productivity and may also adversely affect the purity of the produced alumina. Therefore, there is an ongoing and increasing need to lower the organic carbon concentration and/or control the impact of organic impurities in the Bayer plant liquor.

A number of methods to lower the organic carbon concentration of Bayer plant liquors have been disclosed. For example, U.S. Pat. No. 4,215,094 discloses accelerated oxidation of the organic species. U.S. Pat. No. 4,668,486 discloses the addition of Cu oxidation catalyst to a Bayer liquor, followed by precipitation of Cu by $Na_2S$. The precipitate must then be removed, requiring a separate (additional) filtration step. Other methods intended to improve on the oxidation of organic species in Bayer liquors are disclosed in WO 2010/105305 ("wet" oxidation), U.S. Pat. No. 6,555,077 (pressurized oxidation); U.S. Pat. No. 4,836,990 (manganese-catalyzed oxidation), EP0092028 (magnesium-catalyzed oxidation) and WO 2005/016825A1 (ozone treatment). Non-oxidative methods include addition of polydiallyldimethylammonium chloride, as described in U.S. Pat. Nos. 4,578,255 and 5,284,634; liquid-liquid extraction. Other methods include solid-liquid calcination; biodegradation; electrodialysis; and combinations of two or more of any of the foregoing methods of organic carbon reduction.

The effect of native compounds known as humates (humins) on the Bayer process is disclosed in U.S. Pat. No. 4,663,133. Other academic studies or reviews of bauxite impurities are found in non-patent literature. Organic impurities are the focus of review/overview type articles by Sonthalia R. et al., International Journal ofMineral Processing, Volume 125, 10 Dec. 2013, Pages 137-148; Power, G. and Loh, J., Hydrometallurgy 2010 Dec. 1; 105(1-2):1-29; Power, G., et al., Hydrometallurgy 2012 Oct. 1; 127:125-49; and Soucy, Laroque and Forte, LightMetals 2004, 109-114.

Organic compounds in bauxite ores may further contain one or more hydroxyl groups. In fact many naturally arising organic molecules include one or more hydroxyl groups: for example, sugars and polysaccharides, phenolics such as lignin and its byproducts, and humins or humic acids are all naturally arising organic compounds (native compounds) that may be identified as present within one or more bauxite ore products. Hydroxylated organic compounds are present in bauxite ores, and thus in the digested Bayer liquors formed from bauxite ores, as noted in a number of academic papers. For example, Pulpeiro et al, LightMetals, 1998, 284, states that Bayer liquor includes a "cocktail" of organic compounds, such as benzene carboxylates, phenolic acids, humic acids, and degradation products of these. Pulpeiro et al further note the solubility of these impurities in the caustic (strong base solution) used to digest bauxite ores to result in a Bayer liquor.

Power and Loh, Hydrometallurgy, 2010 Dec. 1; 105(1-2):1-29, state that organic compounds in bauxite include polybasic acids, polyhydroxy acids, alcohols and phenols, humic and fulvic acids, and other carbohydrates; and these compounds form organic sodium salts during the Bayer process. Of these organic salts, sodium oxalate ($Na_2C_2O_4$) has been identified as highly detrimental to the Bayer process, acting to inhibit operations and give rise to a plethora of art surrounding isolation and separation of oxalate species from Bayer liquors.

Organic compounds present in mineral ores and formed during caustic ore treatments such as Bayer liquor formation tend to lower both yield and purity of the resulting mineral product aluminum hydroxide precipitation, reduce liquor productivity and generally lower both yield and purity of the produced alumina. Accordingly, there remains a need in the mining industry to reduce the concentration and/or the impact of organic contaminants in mineral ore slurries. And there remains a need to improve the yield and purity of alumina obtained from Bayer plant liquors.

SUMMARY OF THE INVENTION

Disclosed herein are methods of improving the yield and/or purity of a mineral obtained from a mineral-bearing ore. In embodiments, the method of improving yield of a mineral obtained from a mineral-bearing ore is a method of improving the yield of alumina trihydrate obtained from a bauxite ore.

Accordingly, in an embodiment, the method comprises, consists essentially of, or consists of combining a mineral ore with a boronic acid functional compound to form a treated mineral ore; and processing the treated mineral ore to collect the mineral. In embodiments the yield of the mineral obtained from the treated mineral ore is at least 0.5% by weight greater and as much as 30% by weight greater than the yield that is obtained from the mineral ore using the same processing methods but without adding a boronic acid functional compound. In embodiments, the boronic acid functional compound is polymeric; in other embodiments the boronic acid functional compound is non-polymeric. In embodiments, the boronic acid functional compound is a single compound; in other embodiments, the boronic acid functional compound is a mixture of two or more boronic acid functional compounds. In embodiments, the pH of the mineral ore slurry is between 7 and 14. In some such embodiments the method includes adjusting the pH of the mineral ore slurry to be between 7 and 14 before, during, or after adding the boronic acid functional compound; in other such embodiments the pH of the mineral ore slurry is between 7 and 14 without adjusting.

In some embodiments described herein, the method excludes adding organic compounds having hydroxyl moieties to the mineral ore or to the mineral ore slurry, wherein organic compounds having hydroxyl moieties are collectively referred to herein as "hydroxyl compounds". In some embodiments, the method excludes adding hydroxyl compounds to a treated mineral ore or a treated mineral ore slurry. In embodiments, the method excludes adding hydroxyl compounds having cis-1,2 diol moieties to a mineral ore or a mineral ore slurry. In embodiments, the method excludes adding hydroxyl compounds having cis-1,2 diol moieties to a treated mineral ore or a treated mineral ore slurry. In embodiments, the method excludes adding water soluble hydroxyl compounds to a mineral ore or to a mineral ore slurry. In embodiments, the method excludes adding water soluble hydroxyl compounds to a treated mineral ore or a treated mineral ore slurry. In embodiments, the method excludes adding water soluble hydroxyl compounds having cis-1,2 diol moieties to a mineral ore or a mineral ore slurry. In embodiments, the method excludes adding water soluble hydroxyl compounds having cis-1,2 diol moieties to a treated mineral ore or a treated mineral ore slurry.

In any one or more of the embodiments described herein the method includes adjusting the pH of the mineral ore slurry to be between 7 and 14 before, during, or after adding the boronic acid functional compound; in other such embodiments the pH of the mineral ore slurry is between 7 and 14 without adjusting.

In embodiments, the method results in an increased yield of mineral. Thus, in any one or more embodiments described herein, the method further includes processing (purifying) a treated mineral ore to collect a mineral, wherein the yield of mineral collected is at least 0.5% greater, in weight percent, than the yield of mineral obtained by purifying the mineral ore without adding the boronic acid functional compound. In embodiments the yield of mineral collected is up to 30% greater, in weight percent, than the yield of mineral obtained by purifying the mineral ore without adding the boronic acid functional compound. In embodiments, the one or more organic compounds native to the ore include one or more hydroxyl compounds that are soluble in the ore processing medium. In embodiments, the one or more organic compounds include one or more saccharides, oligosaccharides, polysaccharides, or humins.

In any one or more embodiments described herein, the mineral-bearing ore may be comminuted prior to forming the mineral ore slurry. In embodiments, the mineral-bearing ore is a bauxite ore, the mineral obtained is alumina trihydrate or alumina, and the mineral ore slurry is a bauxite slurry. In embodiments, the bauxite slurry is a Bayer product. In embodiments, the treated mineral ore slurry is a treated bauxite slurry. In embodiments, the treated mineral ore slurry is a treated Bayer product. In embodiments, improving the yield of a mineral from a mineral-bearing ore is improving the yield of alumina trihydrate obtained from a bauxite ore. In any one or more of the above embodiments, the boronic acid functional compound is added to a bauxite ore or to a Bayer product neat (100% actives or 100% solids); alternatively, the boronic acid functional compound is added to the bauxite or the Bayer product as an aqueous solution thereof. In still other embodiments, the boronic acid functional compound is added to the bauxite or the Bayer product in a non-aqueous solution thereof.

In any one or more embodiments described herein, processing the treated mineral ore is Bayer processing of a treated bauxite ore. In embodiments, Bayer processing of a treated Bayer product comprises, consists essentially of, or consists of one or more of: digesting, clarifying, precipitating, classifying, and calcining. In some such embodiments, a boronic acid functional compound is added to a bauxite ore or a bauxite slurry before, during, or after one or more of: comminuting, beneficiating, digesting, clarifying, or precipitating.

In any one or more embodiments described herein, a method includes combining a boronic acid functional compound with a Bayer product to form a treated Bayer product. The combining is during or after one or more of digesting, clarifying, precipitating or classifying, stages of the Bayer process, wherein a Bayer product is a bauxite ore subjected to or present within one or more digestion, clarification, precipitation or classification, steps associated with the Bayer process. Thus, a Bayer product combined with a boronic acid functional compound is a treated Bayer product (treated Bayer slurry).

Additionally, in any one or more embodiments described herein, a method includes combining a boronic acid functional compound with a bauxite ore to form a treated bauxite ore; then subjecting the treated bauxite ore to one or more digesting, clarifying, precipitating or classifying, stages of the Bayer process. That is, a treated bauxite ore is digested, or slurried in a strong base medium, to form a treated Bayer product as defined above. In subsequent steps of the Bayer process, the treated Bayer products obtain an increased yield of alumina trihydrate.

A treated Bayer product produces a higher yield of alumina trihydrate in the precipitation step than the corresponding Bayer product after both products are subjected to the same Bayer processing. In embodiments, the yield of alumina obtained from the treated Bayer product is 0.5% to 30% higher by weight than the yield of alumina obtained from the corresponding untreated Bayer product.

Additionally, in any one or more embodiments described herein, a treated Bayer product produces a higher purity of alumina trihydrate in the precipitation step than the corresponding Bayer product after both products are subjected to the same Bayer processing. In embodiments, Bayer processing of a treated bauxite ore or treated Bayer product obtains a collected alumina product having an increased alumina content of at least 0.1 wt % and as much as 30 wt % compared to an alumina product collected from the same bauxite ore or Bayer product, subjected to the same Bayer processing as the treated ore or treated Bayer product.

Other objects and features will be in part apparent and in part pointed out hereinafter.

DETAILED DESCRIPTION

Although the present disclosure provides references to preferred embodiments, persons skilled in the art will recognize that changes may be made in form and detail without departing from the spirit and scope of the invention. Various embodiments will be described in detail with reference to the drawings, wherein reference to various embodiments does not limit the scope of the claims attached hereto. Additionally, any examples set forth in this specification are not intended to be limiting and merely set forth some of the many possible embodiments for the appended claims.

Definitions

Unless otherwise defined, all technical and scientific terms used herein have the same meaning as commonly understood by one of ordinary skill in the art. In case of conflict, the present document, including definitions, will control. Preferred methods and materials are described below, although methods and materials similar or equivalent to those described herein can be used in practice or testing of the present invention. All publications, patent applications, patents and other references mentioned herein are incorporated by reference in their entirety. The materials, methods, and examples disclosed herein are illustrative only and not intended to be limiting.

As used herein, "organic compound" means a compound including one or more carbon atoms and excluding boron atoms. A boronic acid functional compound, however, may include a residue or moiety including one or more carbon atoms (an organic residue or moiety).

As used herein, the terms "hydroxyl", "hydroxyl compound", and similar terms refer generally to an organic compound having at least one carbon bonded to one hydroxyl group, that is, a C—O—H moiety, wherein the carbon is not also bonded to another oxygen. "Diol" refers to a single compound having two hydroxyl moieties. "Polyol" refers to a single compound having more than two hydroxyl moieties.

As used herein, the terms "native" and like terms referring to a source of a material or a compound indicates that the material or compound is obtained by excavating an ore, and is present in the ore product as excavated and prior to any processing of the ore. Additionally, such terms refer to the degradation products of materials or compounds within the ore product as further obtained within, or during, a mineral purification process.

As used herein, the term "poisoning" or "poison" indicates that an organic compound, or a degradation product, reaction product, or rearrangement product thereof causes or is capable of causing a reduced yield of mineral obtained in a mineral purification process, further wherein the mineral yield is reduced compared to the same conditions in the absence of organic compounds. Thus for example, the presence of 0.1 wt % of an organic compound in an ore is said to poison a mineral purification process where a reduced mineral yield attributable to the organic compound is greater than 0.1 wt %.

As used herein, the term "soluble" and similar terms such as "solubility" or "dissolved" indicates at least 100 ppm of the indicated compound or material may be dissolved in, or is dissolved in the indicated solvent at 25° C. In the case of a polymer, the terms "dispersible" or "dispersion" may in some embodiments be recited in place of "soluble" or "solution", indicating a combination of a polymer with a solvent or solution that results in or develops homogeneous physicochemical properties. Discussions herein related to water solubility are not limited necessarily to solubility in pure water; accordingly, terms such as "aqueous", "water-based" and similar terms indicate water that may include, depending on context, one or more organic or inorganic solutes or cosolvents; for example, salts, water miscible liquids, pH adjustment agents, solid particulates, dissolved solids, dissolved gases, polymers, surfactants, hydrotropes, and the like are suitably included in an aqueous solution or dispersion as discussed herein and further in accord with context.

As used herein, the term "slurry" means a mixture of undissolved particulate solid with water or with an aqueous solution.

As used herein, the term "Bayer process" and similar terms in context refer to one or more of the following individually or collectively, as determined by context: digestion, clarification, precipitation, classification, and calcination. The products of each of these individual processes, or the final product of all these processes collectively, are referred to herein generally as "Bayer products". Unless otherwise specified or determined by context, general references to the Bayer process or to Bayer products refer to continuous Bayer processes and products thereof.

As used herein, the term "flocculated Bayer product" means a combination inclusive of a polysaccharide and a Bayer product, and exclusive of a boronic acid functional compound.

As used herein in connection with Bayer processes, "digestion" and similar terms in context refer to compositions or processes wherein an aluminate is extracted from bauxite by contacting bauxite with sodium hydroxide solution ("caustic" or "caustic solution") to form a Bayer product that is a slurry including dissolved sodium aluminate.

As used herein in connection with Bayer processes, "clarification" and similar terms in context refer to compositions or processes wherein the Bayer slurry is partitioned to form a solid phase residue ("red mud", a Bayer product) and an aluminate solution ("liquor", "Bayer liquor", a Bayer product). In embodiments, the aluminate solution is a saturated aluminate solution. In embodiments, the aluminate solution is a supersaturated aluminate solution.

As used herein in connection with Bayer processes, "precipitation" and similar terms in context refer to compositions or processes wherein solid alumina trihydrate is formed and precipitated from a Bayer liquor by crystallization.

As used herein in connection with Bayer processes, the term "classification" and similar terms in context refer generally to compositions or processes for separating and collecting aluminum hydroxide crystals based on crystal size. The crystals are collected from a Bayer liquor, leaving what is referred to industrially as "spent liquor" or Bayer spent liquor (a Bayer product). In embodiments, a Bayer spent liquor is recycled within the Bayer process, e.g. added back into the process in the digestion stage. In other embodiments the Bayer spent liquor is evaporated to harvest residual sodium hydroxide.

As used herein in connection with Bayer processes, "calcination" and similar terms in context refer to compositions or processes wherein alumina trihydrate is decomposed by heat to form to aluminum oxide, and wherein the oxide is collected or harvested as the principal end product.

The terms "comprise(s)," "include(s)," "having," "has," "can," "contain(s)," and variants thereof, as used herein, are intended to be open-ended transitional phrases, terms, or words that do not preclude the possibility of additional acts or structures. The singular forms "a," "and" and "the" include plural references unless the context clearly dictates otherwise. The present disclosure also contemplates other embodiments "comprising," "consisting of" and "consisting essentially of," the embodiments or elements presented herein, whether explicitly set forth or not.

As used herein, the term "optional" or "optionally" means that the subsequently described event or circumstance may but need not occur, and that the description includes instances where the event or circumstance occurs and instances in which it does not.

As used herein, the term "about" modifying, for example, the quantity of an ingredient in a composition, concentration, volume, process temperature, process time, yield, flow rate, pressure, and like values, and ranges thereof, employed in describing the embodiments of the disclosure, refers to variation in the numerical quantity that can occur, for example, through typical measuring and handling procedures used for making compounds, compositions, concentrates or use formulations; through inadvertent error in these procedures; through differences in the manufacture, source, or purity of starting materials or ingredients used to carry out the methods, and like proximate considerations. The term "about" also encompasses amounts that differ due to aging of a formulation with a particular initial concentration or mixture, and amounts that differ due to mixing or processing a formulation with a particular initial concentration or mixture. Where modified by the term "about" the claims appended hereto include equivalents to these quantities. Further, where "about" is employed to describe a range of values, for example "about 1 to 5" the recitation means "1 to 5" and "about 1 to about 5" and "1 to about 5" and "about 1 to 5" unless specifically limited by context.

As used herein, "substantially" means "consisting essentially of", as that term is construed in U.S. patent law, and includes "consisting of" as that term is construed in U.S. patent law. For example, a solution that is "substantially free" of a specified compound or material may be free of that compound or material, or may have a minor amount of that compound or material present, such as through unintended contamination, side reactions, or incomplete purification. A "minor amount" may be a trace, an unmeasurable amount, an amount that does not interfere with a value or property, or some other amount as provided in context. A composition that has "substantially only" a provided list of components may consist of only those components, or have a trace amount of some other component present, or have one or more additional components that do not materially affect the properties of the composition. Additionally, "substantially" modifying, for example, the type or quantity of an ingredient in a composition, a property, a measurable quantity, a method, a value, or a range, employed in describing the embodiments of the disclosure, refers to a variation that does not affect the overall recited composition, property, quantity, method, value, or range thereof in a manner that negates an intended composition, property, quantity, method, value, or range. Where modified by the term "substantially" the claims appended hereto include equivalents according to this definition.

As used herein, any recited ranges of values contemplate all values within the range and are to be construed as support for claims reciting any sub-ranges having endpoints which are real number values within the recited range. By way of a hypothetical illustrative example, a disclosure in this specification of a range of from 1 to 5 shall be considered to support claims to any of the following ranges: 1-5; 1-4; 1-3; 1-2; 2-5; 2-4; 2-3; 3-5; 3-4; and 4-5.

DISCUSSION

We have found that adding one or more boronic acid functional compounds to a mineral ore containing a native source of organic compounds results in a treated mineral ore. In embodiments where the mineral ore is a bauxite ore, and the ore is subsequently processed according to the Bayer process to result in one or more Bayer products, adding a boronic acid functional compound to the bauxite ore or a Bayer product followed by processing the treated bauxite ore or treated Bayer product using one or more processes associated with the Bayer process results in an increased yield and/or purity of alumina compared to the same bauxite ore or Bayer product that is subjected to the same process(es) but in the absence of a boronic acid functional compound.

First Embodiments

Accordingly, in first embodiments, a method comprises, consists essentially of, or consists of adding an effective amount of a boronic acid functional compound to a bauxite ore to form a treated bauxite ore. In related embodiments, a method comprises, consists essentially of, or consists of adding an effective amount of a boronic acid functional compound to a Bayer product to form a treated Bayer product. The effective amount of the boronic acid functional compound is the amount of the boronic acid functional compound added to the Bayer product to obtain a yield of alumina that is at least 0.5% higher by weight than the yield of alumina obtained from the corresponding untreated Bayer product.

In one or more first embodiments described herein, the methods further include processing a treated bauxite ore or a treated Bayer product according to conventional procedures of one or more steps of the Bayer process, wherein the result of Bayer processing of a treated bauxite ore or treated Bayer product is that the actual yield of alumina obtained is increased by at least 0.5 wt % and as much as 30 wt % based on the weight of alumina obtained from the same bauxite ore or Bayer product subjected to the same Bayer processing except that no boronic acid functional compound is added.

The Bayer process typically comprises: a digestion stage, wherein alumina is extracted by digesting the bauxite in a solution of sodium hydroxide solution ("caustic" or "caustic solution") forming an aqueous sodium aluminate solution; a clarification stage, wherein a solid phase residue ("red mud" or "bauxite residue) is separated from a supersaturated aluminate solution ("pregnant liquor") via sedimentation and filtering; a precipitation stage, wherein aluminum trihydrate is precipitated from the sodium aluminate solution ("liquor" or "Bayer Process liquor") and grown in the form of aluminum trihydrate crystals (crystallization); a classification stage, wherein the crystals are separated from the mixture; and finally a calcination stage, wherein the aluminum trihydrate decomposes to aluminum oxide that is harvested as the principal end product. More detailed descriptions of the Bayer process and its steps are readily available, and further are well known to those of skill.

In some first embodiments, a boronic acid functional compound is added upstream of a precipitation stage of the Bayer process to form a treated Bayer product. In some first embodiments, a boronic acid functional compound is added upstream of a clarification stage of the Bayer process to form a treated Bayer product. In some first embodiments, a boronic acid functional compound is added upstream of a digestion stage of the Bayer process to form a treated Bayer product. In some first embodiments, a boronic acid functional compound is added to a bauxite ore to form a treated bauxite ore, and water is added to the treated bauxite ore to form a treated slurry, which is then subjected to all stages of the Bayer process; in some such embodiments, caustic is also added to the water or to the treated slurry to form a treated Bayer product in the digestion stage.

We have observed that the yield of alumina trihydrate crystals obtained in the precipitation step of the Bayer process is increased by the addition of boronic acid functional compounds to a bauxite ore or to a Bayer product. Without being limited by theory, we believe that boronic acid functionalities react with organic compounds present in one or more bauxite ores or Bayer products, forming one or more boronate reaction products. For example, boronate esters include monoesters, diesters, and mixed esters known to form by reaction with hydroxylated organic compounds, in particular 1,2-diols that may be present in any one or more mineral ores.

It is known that boronic acid functional compounds react reversibly with hydroxyl-functional compounds in aqueous environments as a function of pH to form boronate esters. In the Bayer process, steps such as digestion involve an aqueous environment wherein pH is 7 or more, such as 7-14, or 7-13, or 7-12, or 7-11, or 7-10, or 7-9, or 8-9, or 8-10, or 8-11, or 8-12, or 8-13, or 8-14, or 9-11, or 9-12, or 9-13, or 9-14, or 10-12, or 10-13, or 10-14. In such basic environments, boronic acid functional compounds are capable of reacting with native organic compounds, in particular those bearing hydroxyl groups, to form boronate monoesters, mixed esters, or diesters. Native organic compounds having 1,2- and/or 1,3-cis diol functionality may react with boronic acid functional compounds to form cyclic borate diesters. In non-bauxite mineral ore slurries, the pH may require adjustment to reach 7 or more. Accordingly, in any one or more of the embodiments described herein the method includes adjusting the pH of a mineral ore slurry to be between 7 and 14 before, during, or after adding the boronic acid functional compound. Adjusting pH means adding a base or "caustic" compound to a mineral ore slurry including at least water or water combined with a water miscible solvent, to reach a pH of 7 or more. Suitable pH adjustment agents include, among others, sodium hydroxide, sodium carbonate, and sodium bicarbonate.

It is recognized by the skilled artisan that organic compounds in bauxite ores or Bayer products may include or form various species of oxalates, amino acids, hydroxamic acids, humic acid and/or humates, and saccharides including monosaccharides, disaccharides, oligosaccharides, and polysaccharides. Exemplary species of native organic compounds vary widely in both type and concentration, depending upon the location and particular ore excavated as a mining product.

The effect of native organic hydroxylated compounds in lowering alumina yield from the Bayer process is further magnified by the continuous process employed industrially, wherein soluble compounds may be carried forward in multiple process cycles, thereby exerting yield-lowering effects over multiple cycles of the continuous process.

As an exemplary class of native organic compounds, saccharides are organic hydroxylated compounds characterized as polyols. In embodiments saccharides are further characterized as including one or more 1,2-diol and/or 1,3-diol functionalities. In some embodiments, a single polysaccharide molecule may include hundreds or even thousands of such diol functionalities. It is discussed in the literature that organic compounds bearing 1,2-diol and 1,3-diol functionalities in particular have a detrimental impact on the precipitation of alumina trihydrate from Bayer liquor, corresponding to lower yield of alumina trihydrate obtained from Bayer processing. Thus, in an exemplary but nonlimiting treated Bayer product, boronic acid functionalities subjected to an aqueous pH above 7 react with one or more saccharides present in the Bayer product as a result of being present in the bauxite ore used to make the product. Bayer processing of the treated Bayer product thereby obtains a higher yield of aluminum hydroxide at the conclusion of the Bayer process. In embodiments, as a result of caustic digestion, Bayer products supply the pH range necessary to cause the reaction of one or more boronic acid functional compounds with one or more hydroxylated organic compounds present in the bauxite ore or the Bayer product.

Accordingly, in some first embodiments described herein, the method suitably excludes adding organic compounds having hydroxyl moieties (hydroxyl compounds) to at least one of: a mineral ore, a treated mineral ore, a mineral ore slurry, or a treated mineral ore slurry. In any such embodiments, the methods described herein suitably exclude adding organic compounds having 1,2 diol or 1,3-diol moieties to a mineral ore, a treated mineral ore, a mineral ore slurry, or a treated mineral ore slurry. In any such first embodiments, the methods described herein suitably exclude adding water soluble or dispersible organic compounds having hydroxyl moieties to a mineral ore, a treated mineral ore, a mineral ore slurry, or a treated mineral ore slurry. In any such first embodiments, the methods described herein exclude adding water soluble or dispersible organic compounds having 1,2-diol or 1,3-diol moieties to a mineral ore, a treated mineral ore, a mineral ore slurry, or a treated mineral ore slurry. In any of the foregoing first embodiments, the mineral ore is a bauxite ore, the treated mineral ore is a treated bauxite ore, the mineral ore slurry is a Bayer product, and/or the treated mineral ore slurry is a treated Bayer product.

Unexpectedly, neither the boronic acid functional compounds, nor any reaction products thereof are observed to have any deleterious ("poisoning") effect when present during any step of the Bayer process. We have observed no unintended side reactions or other physicochemical effects that directly or indirectly cause a reduced yield of alumina when a treated bauxite ore or treated Bayer product is further subjected to one or more steps of the Bayer process. In some embodiments, one or more reaction products of the boronic acid functional compounds separate from a treated Bayer product, for example by phase separation to form a solid within the treated Bayer product (precipitation). In other embodiments one or more reaction products of the boronic acid functional compounds are soluble or dispersible within one or more treated Bayer products. In some embodiments where the Bayer process is a continuous Bayer process, boronic acid functional compounds and/or one or more reaction products thereof are carried along and recycled within the Bayer process circuit, further without reducing the yield of aluminum hydroxide or alumina obtained from the processing.

In addition to not decreasing the yield of alumina product obtained, we have observed that the treated bauxite ores and treated Bayer products of first embodiments obtain improved yield of alumina product compared to the yield of alumina product obtained from bauxite ores or Bayer products that are not treated by addition of an effective amount of boronic acid functional compounds, further wherein the effective amount of the boronic acid functional compound is the amount of the boronic acid functional compound required to obtain a yield of alumina product that is at least 0.5% higher by weight than the yield of alumina product obtained from the corresponding untreated bauxite ore or untreated Bayer product, processed according to the same process as the treated bauxite ore or treated Bayer product.

Thus, Bayer processing of a treated bauxite ore or treated Bayer product obtains an increase in yield of collected alumina product of at least 0.5 wt % and as much as 30 wt % based on the weight of alumina product collected from the same weight of bauxite ore or Bayer product, subjected to the same Bayer processing as the treated ore or treated Bayer product; for example, an increase in weight percent yield of alumina of about 1% to 30%, or 2% to 30%, or 3% to 30%, or 4% to 30%, or 5% to 30%, or 10% to 30%, or 0.5% to 25%, or 0.5% to 20%, or 0.5% to 15, or 0.5% to 10%, or 0.5% to 5%, or 1% to 20%, or 2% to 20%, or 2% to 15%, or 3% to 15%, or 3% to 13%. In some embodiments, Bayer processing of a treated bauxite ore or treated Bayer product results in an increase of alumina yield of at least 1 wt % based on the weight of alumina obtained from the bauxite ore or Bayer product subjected to the same Bayer processing as the treated bauxite ore or treated Bayer product, for example an increase in weight percent yield of alumina of at least 2%, or at least 3%, or at least 4%, or at least 5%, or at least 7%, or at least 10%, or at least 15%, or at least 17%, or at least 20%.

In some embodiments, the treated bauxite ores and treated Bayer products of first embodiments result in improved purity of produced alumina when compared to the purity of produced alumina obtained from bauxite ores or Bayer products that are not treated by addition of an effective amount of boronic acid functional compounds. Alumina collected as the product of Bayer processing is referred to herein as "produced alumina" or "alumina product" and generally includes alumina as well as side products and impurities. In some embodiments the "effective amount" of the boronic acid functional compound is the amount of the boronic acid functional compound required to produce an alumina product having at least 0.1% by weight more alumina content than the alumina product obtained from untreated bauxite ore or untreated Bayer product. The increased purity of the collected alumina product may be observed in addition to increased yield of collected alumina product; or increased purity of the collected alumina product may be observed without a concomitant increase in yield of collected alumina product.

Thus, in embodiments, Bayer processing of a treated bauxite ore or treated Bayer product obtains a collected alumina product having an increased alumina content of at least 0.1 wt % and as much as 30 wt % based on the alumina content of an alumina product collected from the same bauxite ore or Bayer product, subjected to the same Bayer processing as the treated ore or treated Bayer product, for example, an increase in alumina content of about 0.1 wt % to 30 wt %, or 0.2 wt % to 30 wt %, or 0.3 wt % to 30 wt %, or 0.4 wt % to 30 wt %, or 0.5 wt % to 30 wt %, or 1 wt % to 30 wt %, or 2 wt % to 30 wt %, or 3 wt % to 30 wt %, or 4 wt % to 30 wt %, or 5 wt % to 30 wt %, or 10 wt % to 30 wt %, or 0.1 wt % to 25 wt %, or 0.1 wt % to 20 wt %, or 0.1 wt % to 15, or 0.1 wt % to 10 wt %, or 0.1 wt % to 5 wt %, or 0.1 wt % to 4 wt %, or 0.1 wt % to 3 wt %, or 0.1 wt % to 2 wt %, or 0.1 wt % to 1 wt %, or 0.1 wt % to 0.5 wt %, or 0.5 wt % to 10 wt %, or 0.5 wt % to 9 wt %, or 0.5 wt % to 8 wt %, or 0.5 wt % to 7 wt %, or 0.5 wt % to 6 wt %, or 0.5 wt % to 5 wt %, or 0.5 wt % to 4 wt %, or 0.5 wt % to 3 wt %, or 0.5 wt % to 2 wt %, or 0.5 wt % to 1 wt %, or 1 wt % to 20 wt %, or 1 wt % to 15 wt %, or 1 wt % to 10 wt %, or 1 wt % to 9 wt %, or 1 wt % to 8 wt %, or 1 wt % to 7 wt %, or 1 wt % to 6 wt %, or 1 wt % to 5 wt %, or 3 wt % to 15 wt %, or 3 wt % to 10 wt %, or 5 wt % to 15 wt %, or 5 wt % to 10 wt %. In some embodiments, Bayer processing of a treated bauxite ore or treated Bayer product obtains a collected alumina product having an increased alumina content of at least 0.1 wt % compared to the alumina content weight obtained from the same bauxite ore or Bayer product subjected to the same Bayer processing as the treated bauxite ore or treated Bayer product, for example an increase in alumina content of at least 0.2 wt %, or at least 0.3 wt %, or at least 0.4 wt %, or at least 0.5 wt %, or at least 0.7 wt %, or at least 1.0 wt %, or at least 1.5 wt %, or at least 2.0 wt %, or at least 2.5 wt %, or at least 3.0 wt %, or at least 3.5 wt %, or at least 4.0 wt %, or at least 4.5 wt %, or at least 5.0 wt %.

In any such first embodiments, suitable boronic acid functional compounds include both polymeric and non-polymeric species thereof. In embodiments, a boronic acid functional compound has the following formula.

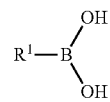

wherein $R^1$ is a non-polymeric organic residue having 1 to 30 carbons; or $R^1$ is an organic polymer residue. In non-polymeric boronic acid functional compounds $R^1$ is an organic residue characterized as having no repeating units (that is, it is not a dimer, oligomer or polymer). In embodiments, $R^1$ is a hydrocarbyl group having 1 to 30 carbon atoms, such as 2 to 30, or 3 to 30, or 4 to 30, or 5 to 30, or 6 to 30, or 7 to 30, or 8 to 30, or 9 to 30, or 10 to 30, or 2 to 24, or 2 to 20, or 2 to 19, or 2 to 18, or 2 to 17, or 2 to 16, or 2 to 15, or 2 to 14, or 2 to 13, or 2 to 12, or 2 to 11, or 2 to 10, or 3 to 20, or 4 to 16, or 4 to 12 carbon atoms. In some such embodiments, $R^1$ further includes one or more heteroatoms selected from O, N, S, Cl, Br, or F. In embodiments, the non-polymeric boronic acid functional compound is an arylboronic acid, alkylboronic acid, cycloalkylboronic acid, or alkarylboronic acid.

Non-limiting examples of suitable non-polymeric boronic acid functional compounds include methylboronic acid, ethylboronic acid, 2-methyl-1-propylboronic acid, N-butylboronic acid, cyclohexylboronic acid, cyclohexenylboronic acid, and N-dodecylboronic acid, as well as chlorinated or fluorinated adducts thereof, arylboronic acids such as phenylboronic acid, o, m, and p-tolylboronic acid, naphthalen-2-ylboronic acid, 4-cyclohexylphenylboronic acid, 1-pyrenylboronic acid, 4-pyrenylboronic acid, and the like. In some embodiments the non-polymeric boronic acid functional compound is water soluble. In embodiments, $R^1$ is phenyl and the boronic acid functional compound is phenylboronic acid.

Boronic acid functional polymers include two or more chemical sequences that are repeated in a single molecule ("repeat unit"), further wherein at least one repeat unit includes boronic acid functionality. In some embodiments, useful boronic acid-functional monomers include α,β-unsaturated compounds wherein polymerization or copolymerization is carried out by homolytic or redox initiation. Such processes are familiar to the skilled artisan.

Non-limiting examples of boronic acid functional polymers include polymerized and copolymerized residues of at least one vinyl monomer containing a boronic acid moiety. Examples of vinyl monomers containing a boronic acid functionality include but are not limited to such as vinylboronic acid, 3-(acrylamido)phenylboronic acid, 4-(acrylamido)phenylboronic acid, 2-(acrylamide)phenylboronic acid, 4-vinylphenylboronic acid, 3-vinylphenylboronic acid, 2-vinylphenylboronic acid and mixtures thereof. In embodiments, the boronic acid containing monomer is 3-(acrylamido)phenylboronic acid.

In some embodiments, boronic acid functional polymers are copolymers of a boronic acid functional vinyl monomer with one or more vinyl monomers that do not include boron. In such embodiments, the boronic acid functional monomer residue is 0.01 mol % to 100 mol % of the monomer residues in the polymer, for example 0.01 mol % to 50 mol %, or 0.01 mol % to 25 mol %, or 0.01 mol % to 10 mol %, or 0.01 mol % to 5 mol %, or 0.01 mol % to 3 mol %, or 0.01 mol % to 2 mol %, or 0.01 mol % to 1 mol %, or 0.1 mol % to 50 mol %, or 0.1 mol % to 25 mol %, or 0.1 mol % to 10 mol %, or 0.1 mol % to 5 mol %, or 0.1 mol % to 3 mol %, or 0.1 mol % to 2 mol %, or 0.1 mol % to 1 mol %, or 1 mol % to 50 mol %, or 1 mol % to 25 mol %, or 1 mol % to 10 mol %, or 1 mol % to 5 mol %, or 1 mol % to 3 mol %, or 1 mol % to 2 mol %. Suitable vinyl monomers that are not boronic acid functional include monomers such as acrylates and acrylamides including acrylic acid, acrylamide, N,N-dimethylacrylamide, 2-acrylamido-2-methylpropane sulfonic acid or its salts; N,N,N-trimethyl-2-[(1-oxo-2-propenyl)oxy]-ethanaminium chloride, N,N-dimethyl-N-propenyl-2-propen-1-aminium chloride, 2-(acryloyloxy)-N,N,N-trimethylethanaminium (DMAEA.MCQ); and diallyldialkylammonium chlorides including diallyldimethylammonium chloride, as well as mixture of two or more of any of these.

The molecular weight of useful boronic acid functional polymers is not particularly limited. Boronic acid functional polymers include dimers, trimers, and oligomers (4-10 repeat units total) as well as higher order polymers having more than 10 total repeat units, wherein at least one repeat unit includes boronic acid functionality. Polymers having a weight average molecular weight of 200 g/mol to $1 \times 10^8$ g/mol are suitably employed as polymers herein, in embodiments a weight average molecular weight of 500 g/mol to $1 \times 10^8$ g/mol, or 1000 g/mol to $1 \times 10^8$ g/mol, or 5000 g/mol to $1 \times 10^8$ g/mol, or $1 \times 10^4$ g/mol to $1 \times 10^8$ g/mol, or $2 \times 10^4$ g/mol to $1 \times 10^8$ g/mol, or $5 \times 10^4$ g/mol to $1 \times 10^8$ g/mol, or $1 \times 10^5$ g/mol to $1 \times 10^8$ g/mol, or $1 \times 10^6$ g/mol to $1 \times 10^8$ g/mol, or 200 g/mol to $1 \times 10^7$ g/mol, or 200 g/mol to $1 \times 10^6$ g/mol, or 200 g/mol to $1 \times 10^5$ g/mol, or 200 g/mol to $1 \times 10^4$ g/mol, or 200 g/mol to $1 \times 10^3$ g/mol. Methods employed to determine weight average molecular weight are familiar to the skilled artisan, and in embodiments such methods include gel permeation chromatographic methods. The methodology useful to make the boronic acid functional polymers is not particularly limited. One of skill will appreciate that numerous methods of making vinyl polymers are available in the art. Such methods include polymerization and copolymerization of neat monomers, monomers in solution, and monomers in emulsion, including water-in-oil and oil-in-water emulsion.

In embodiments the polymeric boronic acid functional compounds have one or more of the following properties: nonionic, anionic, cationic, amphoteric, and associative. In embodiments, the polymeric boronic acid functional compounds are linear, branched, hyperbranched, or dendritic. In embodiments the polymeric boronic acid functional compounds are random, blocky, alternating, or intermediate between two or more of these. In embodiments the polymeric boronic acid functional compounds are crosslinked; in other embodiments the polymeric boronic acid functional compounds are uncrosslinked.

In embodiments, the polymeric boronic acid functional compound is water soluble or water dispersible. In embodiments, the polymeric boronic acid functional compound includes a net cationic or anionic charge; in other embodiments the boronic acid functional compound has polymer ionic charge; in still other embodiments the polymeric boronic acid functional compound includes ionic charge but has a net zero charge (that is, there are equimolar amounts of cationic and anionic monomer residues). In embodiments, the polymeric boronic acid functional polymer is a copolymer of acrylamide and 3-(acrylamido)phenylboronic acid. In embodiments, the polymeric boronic acid functional polymer is dispersed or dissolved within a polymer latex or an aqueous solution; in other embodiments the boronic acid functional polymer is a dry powder form. In embodiments an aqueous solution or latex includes one or more surfactants or water-miscible cosolvents.

Accordingly, any one or more of the methods described in first embodiments herein may further include an initial determination of boronic acid benefit for a specific mineral ore, prior to processing the ore to obtain the mineral. Determining boronic acid benefit for an ore means determining that a mineral-bearing ore comprises one or more native organic compounds; or determining that addition of a boronic acid functional compound to a mineral ore or a slurry thereof will result in increased yield of mineral; or determining both. The initial determination of boronic acid benefit may be used in the processing of the mineral ore, such as by forming a treated mineral ore or a treated mineral ore slurry, by determining if such treatment is needed and how much boronic acid functional compound should be added to the mineral ore or slurry thereof to obtain an increase in mineral yield.

Thus, in one or more first embodiments described herein, the initial determination of boronic acid benefit comprises, consists essentially of, or consists of determining that a mineral ore includes a native source of organic compounds. Such methodology is familiar to one of skill and typically involves the thermochemical destruction of organic matter by complete oxidation or combustion to $CO_2$, coupled with infrared spectroscopic analysis of total organic carbon. Suitable methods are outlined, for example, in U.S. Environmental Protection Agency report NCEA-C-1282, April 2002 (Schumaker). Further, the use of thermochemical methodology to analyze total organic content of ore materials is confirmed by Pulpeiro et al., *Light Metals*, 1998, 284. The results of such tests may be suitably used to determine if the mineral ore will obtain a benefit by adding a boronic acid functional compound to the ore or to a slurry thereof. Specifically, the confirmed presence of native organic compounds in a mineral ore indicates that addition of boronic acid functional compounds will result in a benefit when the mineral ore is processed, by increasing mineral yield from the process. In such embodiments, the amount of the boronic acid functional compound added to a mineral ore or mineral slurry may be selected by the operator to target the amount of organic compounds present in the mineral ore. In some such embodiments, the amount of the boronic acid functional compound added to a mineral ore or mineral slurry may be selected by the operator to target the amount of hydroxylated organic compounds determined, estimated, or calculated based on the total amount of organic carbon present in the mineral ore.

Further, in one or more first embodiments described herein, the initial determination of boronic acid benefit comprises, consists essentially of, or consists of determining that addition of a boronic acid functional compound to a mineral ore or to a slurry thereof will result in increased yield of mineral. By testing a range of concentrations of a boronic acid functional compound, and/or by testing a range of chemically distinct boronic acid functional compounds or mixtures thereof, optimum results of yield are obtained. The optimum amount of boronic acid functional compound is then used in the processing plant to obtain optimal yield, that is, optimal benefit of the boronic acid functional compound addition.

An exemplary but nonlimiting determination related to bauxite ore is carried out comprising, consisting essentially of, or consisting of the following steps, where it will be understood by one of skill that a different ore may be tested using a different procedure in accordance with the specific ore for which a yield benefit is sought:

A sample of a Bayer product to be treated ("test slurry") is obtained from a processing plant and divided into portions; alumina trihydrate is precipitated from a first test slurry portion to determine yield thereof in the absence of boronic acid functional compounds. In some embodiments, measurement of yield is determined by precipitating, isolating, and weighing the mass of alumina trihydrate obtained. Then a selected amount of a selected boronic acid functional compound is added to a second portion of the test slurry, followed by alumina trihydrate precipitation to determine yield thereof.

The alumina trihydrate precipitation is carried out using the same materials and the same process steps for the first and second test slurry portions. In some such embodiments, 0.01 g to 10 g of the boronic acid functional compound is added to the second test slurry portion per liter of the second test slurry. Then the yield of alumina trihydrate precipitated from first and second test slurries is compared to determine if there is a benefit: specifically, if yield of alumina trihydrate is increased by adding the selected amount of the selected boronic acid functional compound. Optionally, third, fourth, or a higher number of test slurry aliquots may be used for one or more additional determinations of yield, wherein the amount of the boronic acid functional compound added is varied, or the chemical structure of the boronic acid functional compound is varied, or both are varied and the resulting yield benefit quantified. Additional benefit is obtained in some embodiments by adjusting the amount of the selected boronic acid functional compound added to further increase yield or further increase yield economy (benefit/cost factor of the addition). Further, additional benefit is obtained in some embodiments by varying the chemical structure of the selected boronic acid functional compound to further increase yield or further increase yield economy (benefit/cost factor of the addition).

An alternative method to measure the amount of aluminum trihydrate precipitated from a Bayer product is to directly determine concentration (alumina, caustic and soda) in the test slurry at the start and end of the precipitation process.

Thus, in some first embodiments, the minimum effective amount of a boronic acid functionalized compound to treat a mineral ore or mineral ore slurry to obtain the benefit of higher yield is determined to be the minimum amount for which the treatment of the mineral ore or mineral ore slurry obtains a measurable increase in mineral yield when compared to an untreated test slurry (first test slurry portion in the above scenario). Further, the maximum effective amount of a boronic acid functionalized compound to treat a mineral ore or Bayer product is the least amount of a boronic acid functionalized compound above which no further yield benefit is obtained. In some embodiments, the optimal amount of boronic acid functional compound is the minimum effective amount. In other embodiments, the optimal amount of boronic acid functional compound is the maximum effective amount. In still other embodiments, the optimal amount of boronic acid functional compound is between the minimum effective amount and the maximum effective amount, taking into account the cost of the boronic acid functional compound vs. additional yield obtained for a selected amount of a selected boronic acid functional compound and/or the particular processing plant conditions and capabilities experienced by an operator.

A number of methods are available to assist the skilled artisan in determining yield benefit by precipitation of a mineral in a mineral ore slurry. Such "precipitation tests" are commonly used by operators to determine a range of issues within a mineral processing circuit and details of the methods used are well documented in the literature. Bayer products are addressed in Watts and Utley, "Volumetric Analysis of Sodium Aluminate Solutions", Anal. Chem. 1953, 25, 6, 864-867. Other sources of mineral yield determination are suitably employed in combination with the foregoing methods of testing mineral ores and/or mineral ore slurries to determine the benefit of adding a boronic acid functional compound.

In some embodiments, a method of determining yield benefit of a bauxite ore is exemplified in the Experimental Section herein, wherein the method of testing a reconstituted refinery spent liquor is usefully employed with a Bayer product in place of the reconstituted product. Thus, in embodiments, a selected amount of a selected boronic acid functional compound is mixed with a Bayer product; then alumina trihydrate seed crystals are added to the mixture; the seeded mixture is then agitated at temperature for a period of time such as 1-3 hours, and then solids are collected from the mixture such as by vacuum filtration. The solids are washed, dried and weighed to determine yield of the precipitate. In some such embodiments, the mixture is maintained at a temperature between 60° C. and 100° C. during the mixing, during the agitation, or during the mixing and agitation. In some such embodiments, the collected solids are washed prior to drying, such as by washing with hot water. In some such embodiments, the precipitate is dried by convection, by heating, or a combination of convection and heating.

Surprisingly, we have found that neither boronic acid functional compounds nor any reaction products thereof appear to act as poisons in a Bayer process. On the other hand, the addition of a boronic acid functional compound to a bauxite ore or a Bayer product containing native organic material results in an increase in yield of alumina obtained, as evidenced by the foregoing tests of yield benefit.

In any one or more embodiments described herein, a mineral-bearing ore is comminuted prior to forming a mineral ore slurry. In embodiments, the mineral-bearing ore is a bauxite ore, and the mineral obtained is alumina trihydrate. In embodiments, the treated mineral ore slurry is a treated Bayer product. In embodiments, the treated mineral ore slurry is a treated Bayer slurry. In embodiments, improving the yield of a mineral from a mineral-bearing ore is improving the yield of alumina trihydrate obtained from a bauxite ore. In embodiments, the boronic acid functional compound is added to the Bayer product neat (100% actives or 100% solids) or as an aqueous solution thereof having 0.001 wt % to 80 wt % boronic acid functional compound dissolved therein, for example 0.01 wt % to 50 wt % or even 1 wt % to 30 wt % boronic acid functional compound dissolved therein. In embodiments, a boronic acid functional compound is added to a bauxite ore or a bauxite slurry before, during, or after one or more of: comminuting, beneficiating, digesting, clarifying, or precipitating.

The methods of the first embodiments are suitably carried out in connection with the Bayer process in any one or more of the known steps of the process, further as described above, particularly in continuous Bayer processes. Additionally, the methods of the first embodiment may be used to form a treated bauxite ore prior to subjecting the ore to the Bayer process. Thus, addition of a boronic acid functional compound to an unprocessed ore, or an ore that is processed only by comminution, followed by beneficiation and then by a process treatment to obtain the mineral, is another aspect of the first embodiment of forming a treated mineral ore such as a treated bauxite ore.

Second Embodiments

In a second set of embodiments, a method comprises, consists essentially of, or consists of adding a polysaccharide to a Bayer product to form a flocculated Bayer product, and then adding a boronic acid functional compound to the flocculated Bayer product to form a treated Bayer product. The added polysaccharide of second embodiments is not native in the ore. Unexpectedly, addition of an effective amount of a boronic acid functional compound to a flocculated Bayer product results in an increase in the yield of alumina weight similar to that described in the first embodiments, that is, an increase of at least 0.5 wt % and as much as 30 wt % yield caused by adding a boronic acid functional compound to a flocculated Bayer product to obtain a treated Bayer product, followed by subsequent collecting of alumina; further as compared to the yield of alumina obtained from the same processing of the same Bayer product in the absence of an effective amount of boronic acid functional compound. The boronic acid functional compounds of the second embodiments are the same as the boronic acid functional compounds of the first embodiments.

In some second embodiments, a boronic acid functional compound is added upstream of a precipitation stage of the Bayer process. In some second embodiments, a polysaccharide is not added to the precipitation stage of the Bayer process. In some second embodiments, a boronic acid functional compound is added to a bauxite ore or a bauxite slurry before, during, or after one or more of: comminuting, beneficiating, digesting, clarifying, or precipitating.

Generally, the efficiency of the Bayer process may be suitably improved by including flocculants as process additives in one or more stages of the Bayer process. Polysaccharides are commonly employed as flocculants in the Bayer process. However, polysaccharides are polyols having hundreds or even thousands of 1,2 and 1,3-diol moieties per polymer chain. One common type of polysaccharide added as a flocculant in the Bayer process is dextran. Crosslinked dextran and crosslinked dihydroxypropyl cellulose are two other commonly employed polysaccharide flocculants.

Crosslinking of polysaccharides may be achieved in one of several known methods prior to, during, or after addition of the polysaccharide to the Bayer product. Crosslinked polysaccharides are commercially widely available; for example, dextran of variable crosslink density can be purchased and used as-is, for example under trade names such as SEPHADEX®, available from the Sigma-Aldrich Chemical Company of St. Louis, MO In some embodiments, a polysaccharide is crosslinked in situ with a boronic acid-containing polymer, as disclosed in U.S. Pat. No. 10,427,950. Such methods include combining a first composition comprising a polysaccharide and a second composition comprising a boronic acid-containing polymer. The combination is added to a Bayer product, where the pH of the Bayer slurry triggers crosslinking of the polysaccharide with the boronic acid-containing polymer In some second embodiments, a boronic acid functional compound is added in excess of the amount required to cause cross-linking of a polysaccharide flocculant. In some second embodiments, an excess amount of boronic acid functional compound is added in a single excess addition of the amount required to cause cross-linking of a polysaccharide flocculant. However, such second embodiments are generally less preferred, because such second embodiments are less efficient for improving alumina yield than adding the excess boronic acid functional compound in multiple additions. For example, adding the excess boronic acid functional compound in separate first and second additions. The lower efficiency of a "single, excess addition" of boronic acid functional compound is due to the tendency of the boronic acid functional compound to continue to react with the polysaccharide flocculant when the flocculant is present in the Bayer product. In such cases the boronic acid functional compound may react preferentially with the added polysaccharide rather than react with native poisons.

Thus, it is preferable in some second embodiments to add boronic acid functional compound to the flocculated Bayer product. Hence, in second embodiments an effective amount of a boronic acid functional compound is added after a polysaccharide flocculant.

EXPERIMENTAL PROCEDURE

Reconstituted refinery spent liquor is prepared in the Examples below by dissolving alumina trihydrate in refinery spent liquor at 95-100° C. Reconstituted liquor containing alumina (A=166.3 g/L), caustic (C=218.9 g/L as $Na_2CO_3$) and soda (S=261.6 g/L as $Na_2CO_3$) (200 mL) is added to 250 mL NALGENE® bottles and placed in a rotating water bath at 90° C.

Testing of reconstituted refinery spent liquor is accomplished by adding phenylboronic acid (solid) to the bottles containing reconstituted refinery spent liquor in an indicated amount; then the bottles are set in a 90° C. water bath until the phenylboronic acid is dissolved. Then the temperature of the water bath is reduced to 70° C. prior to adding 50 g alumina trihydrate as seed crystals. Three hours after adding the alumina trihydrate, the bottles are removed from the water bath and sodium gluconate solution (10 mL, 400 g/L) is added to the mixture in an indicated amount. Solids are collected from the cooled mixture by vacuum filtration using Macherey-Nagel (MN 1672) filter papers, and the filtered residue is washed with hot deionized water and then dried in an oven. The filter paper is weighed to determine collected solids and calculate yield of precipitate.

Synthetic Bayer liquor is prepared by dissolving alumina trihydrate, sodium hydroxide and/or sodium carbonate in water to reach a desired concentration of each component. Aqueous solutions of alumina (A=169.2 g/L), caustic (C=253.0 g/L as $Na_2CO_3$) and soda (S=269.6 g/L as $Na_2CO_3$) are employed to form the mixtures.

Testing of synthetic Bayer liquor is accomplished by adding 200 mL of the synthetic Bayer liquor to a 250 ml NALGENE® bottle and warming it in a water bath set to 75° C. Sodium gluconate solution (87.2 g/L) is added to the warm synthetic Bayer liquor in an indicated amount. Deionized water is added to the bottles to obtain equivalent volumes in all the bottles. Then phenylboronic acid (solid) is added to the synthetic liquor in an indicated amount, and the solid is allowed to mix in the water bath. Solids were then collected from the synthetic Bayer liquor as described below: first, alumina trihydrate seed crystals (commercially available from RJ Marshal Company of Southfield, MI) (50 g) are added to each bottle; the bottles are closed and allowed to rotate end-over-end at 75° C. for 3 hours. Then 10 mL of sodium gluconate solution (400 g/L) is added to each bottle. Solids are collected from the cooled liquor by vacuum filtration using Macherey-Nagel (MN 1672) filter papers, and the filtered residue is washed with hot deionized water and then dried in an oven. The filter paper is weighed to determine collected solids and calculate yield of precipitate.

Example 1

Synthetic Bayer liquor was mixed with 2, 4, or 10 mmol/L of sodium gluconate in the amounts indicated in Table 1. Then phenylboronic acid (PBA) was added to liquor in the amounts indicated in Table 1. Following the addition of PBA, solids were collected from the synthetic Bayer liquor as described above. Yield of solid precipitate obtained from the liquor is reported in Table 1.

The results in Table 1 show that yield of dry solids is substantially decreased when the gluconate solution alone is added; but the effect is ameliorated by the PBA addition. Thus, when 2 mmol/L of gluconate is added, 10 mmol/L of PBA increases the yield of alumina precipitate collected by 4.7% compared to the same liquor without addition of PBA. In the presence of 10 mmol/L of gluconate, 10 mmol/L PBA results in a 4.4% increase in yield, while addition of 30 mmol/L PBA results in 11.8% increase in alumina yield.

TABLE 1

Yield of alumina precipitate in g/L obtained from a synthetic Bayer liquor.

| Treatment | Sodium Gluconate Concentration (mmol/L) | PBA Concentration (mmol/L) | Precipitation Yield (g/L) | Yield St. Dev |
|---|---|---|---|---|
| Control | 0 | 0 | 108.65 | 0.200 |
| Gluconate | 2 | 0 | 91.1 | 0.050 |
| Gluconate | 4 | 0 | 58.50 | 0.650 |
| Gluconate | 10 | 0 | 20.33 | 0.175 |
| Gluconate + PBA | 2 | 10 | 95.40 | 0.250 |
| Gluconate + PBA | 4 | 10 | 68.45 | 0.150 |
| Gluconate + PBA | 10 | 10 | 21.23 | 0.275 |
| Gluconate + PBA | 10 | 30 | 22.73 | 0.075 |

Example 2

Phenylboronic acid (PBA) was added to reconstituted refinery spent liquor in the amounts indicated in Table 2. Following the addition of PBA, solids were collected from the liquor as described above. Yield of solids from the liquor is reported in Table 2.

Similar to the effect observed in Example 1, the effect of PBA addition on native sources of organic poisons in a reconstituted refinery spent liquor leads to an observed increase in yield. In this particular batch of reconstituted refinery spent liquor, about 4.8% to 6.7% increase in yield is observed by adding PBA.

TABLE 2

Yield of precipitate in g/L obtained from a reconstituted refinery spent liquor.

| Treatment | PBA Concentration (mmol/L) | Precipitation Yield |
|---|---|---|
| Control | 0 | 51.25 |
| PBA | 20.5 | 53.70 |
| PBA | 30.7 | 54.70 |

Example 3

Reconstituted refinery spent liquor was prepared as described above and separated into 4 aliquots.

Three of the samples were treated with "polyamide BA". In each case a 2 wt % solution of a copolymer of acrylamide and vinyl boronic acid ("polyamide BA" in Table 3 below) was formed by dissolving the latex copolymer (30% actives) in 20 g/L caustic. Then 10 mL of the copolymer solution was added to a 200 mL sample of the reconstituted refinery spent liquor. In two of the three such treated samples, an additional dose of phenylboronic acid (PBA) was added to the 200 ml sample. Two different dose rates of PBA as detailed in Table 3 were used.

To the fourth sample (Control) an equivalent amount of water was added to ensure that all samples were subjected to the same level of dilution.

Following addition of the treatments, samples were placed in a 90° C. water bath and mixed. Washed sand was then added to each bottle and it was then subsequently mixed for 2 minutes. Then the sand was removed via filtration and the filtered liquor from each sample collected.

Alumina trihydrate crystals (50 g) were added to each bottle of filtered liquor, and the bottles were allowed to rotate end-over-end at 70° C. for 3 hours. Then 10 mL of sodium gluconate solution (400 g/L) was added to each bottle and mixed. Finally, solids were collected by filtration and drying as described above. Yield of dry solids (precipitate) is reported in Table 3.

TABLE 3

Yield of precipitate in g/L obtained from a reconstituted refinery spent liquor of Example 3.

| Treatment | Polyamide BA Concentration (g/L) | PBA Concentration (mmol/L) | Precipitate Yield |
|---|---|---|---|
| Control | 0 | 0 | 51.25 |
| Polyamide BA | 0.3 | 0 | 54.40 |
| Polyamide BA + PBA | 0.3 | 20.5 | 56.10 |
| Polyamide BA + PBA | 0.3 | 30.7 | 56.65 |

What is claimed is:

1. A method of increasing the yield of alumina from a bauxite ore, the process comprising:
   combining the bauxite ore with water to form a bauxite slurry,
   adding an effective amount of boronic acid functional polymer to the bauxite slurry to form a treated slurry; and
   processing the treated slurry to yield an alumina product, wherein the method excludes adding compounds having 1,2-diol or 1,3-diol moieties to the bauxite slurry or the treated slurry; and wherein an effective amount of the boronic acid functional polymer is the amount of the boronic acid functional polymer added to the bauxite slurry to obtain a yield of alumina that is at least 0.5% higher by weight than the yield of alumina obtained from the corresponding untreated slurry processed according to the same process as the treated slurry.

2. The method of claim 1 wherein the pH of the bauxite slurry is 7 or greater or is adjusted to be 7 or greater.

3. The method of claim 1 wherein the processing includes one or more of comminuting, beneficiating, digesting, clarifying, precipitating, classifying, and calcining.

4. The method of claim 1 wherein the boronic acid functional polymer comprises a polymerized residue of vinylboronic acid.

5. The method of claim 1 further comprising determining a boronic acid benefit of the bauxite ore.

6. The method of claim 1 wherein the boronic acid functional polymer is a copolymer further comprising a polymerized residue of acrylamide.

7. The method of claim 1 wherein the boronic acid functional polymer is a copolymer further comprising a polymerized residue of diallyldimethylammonium chloride.

8. A method comprising combining a composition with a bauxite ore, the composition comprising a boronic acid functional polymer and water and excluding polysaccharides.

9. The method of claim 8 further comprising processing the combination of the bauxite ore and the composition to yield an alumina product, wherein the processing includes one or more of comminuting, beneficiating, digesting, clarifying, precipitating, classifying, and calcining.

* * * * *